United States Patent [19]

King et al.

[11] Patent Number: 5,059,244

[45] Date of Patent: Oct. 22, 1991

[54] FUGITIVE COLORANT AND WASHABLE INK COMPOSITIONS

[75] Inventors: Clifford R. King, Taylors; John B. Hines, Spartanburg, both of S.C.

[73] Assignee: Milliken Research Corporation, Spartanburg, S.C.

[21] Appl. No.: 554,319

[22] Filed: Jul. 18, 1990

[51] Int. Cl.$^5$ .............................................. C09D 11/00
[52] U.S. Cl. ........................................ 106/21; 106/22; 8/543; 8/604
[58] Field of Search ...................... 8/543, 604; 106/22, 106/19, 21, 493, 498, 496

[56] References Cited

U.S. PATENT DOCUMENTS

| | | | |
|---|---|---|---|
| 1,799,823 | 4/1931 | Kern et al. | 8/604 |
| 3,449,319 | 6/1969 | Kuhn | 106/19 |
| 4,198,203 | 4/1980 | Groll et al. | 8/661 |
| 4,282,000 | 8/1981 | Groll et al. | 8/661 |
| 4,654,045 | 3/1987 | Rowe | 8/604 |
| 4,877,411 | 10/1989 | Hines et al. | 8/604 |

*Primary Examiner*—Theodore Morris
*Assistant Examiner*—Mary C. DiNunzio
*Attorney, Agent, or Firm*—Timothy J. Monahan; H. William Petry

[57] ABSTRACT

An aqueous solution of a chromophore having at least one sulfonic acid or carboxylic acid functionality and a triethanolamine ethoxylate is provided for a fugitive colorant useful in ink formulations or to temporarily tint textile fibers. Preferably the triethanolamine ethoxylate contains at least nine moles of —$CH_2CH_2O$— units and is present in a molar excess per acid functionality of the chromophore.

30 Claims, No Drawings

FUGITIVE COLORANT AND WASHABLE INK COMPOSITIONS

BACKGROUND OF THE INVENTION

1. Field of the Invention.

This invention relates to fugitive colorant solutions containing an acid substituted chromophore and an amine ethoxylate associated with the acid substituent of the chromophore.

2. Prior Art

Amine ethoxylates have been found to be useful as detergents in removing or inhibiting textile stains. Sapers, U.S. Pat. No. 3,591,325 discloses an alkaline stripping bath containing sodium hydrosulfite and an aliphatic amine which has been ethoxylated and quaternized with a halogenated aromatic compound such as benzyl chloride. The stripping bath is useful to remove the color from treated fabric. The amines are ethoxylated with 4 to 12 moles of ethylene oxide, preferably 5 to 11 moles. In addition to the formulation of Sapers, strong reducing agents such as sodium hydrosulfite have been used alone to decolorize dyes.

Coe et al., U.S. Pat. No. 4,065,257, provide a detergent composition having an ethoxylated amine. The amine contains an unbranched aliphatic hydrocarbon substituent and two polyethyleneoxide substituents which, preferably, contain a total of 8 to 16 moles of ethylene oxide.

Stable solutions of anionic dyes have been produced by reacting the alkali or ammonium salts of acid dyes with a polyalkoxyalkylamine, examples of which may be found in the following U.S. patents:

| U.S. Pat. No. 4,087,245 | Kramer et al. | PROCESS FOR THE PREPARATION OF CONCENTRATED SOLUTIONS OF ANIONIC DYESTUFFS |
| U.S. Pat. No. 4,198,203 | Groll et al. | DYESTUFF SOLUTIONS OF COPPER PHTHALOCYANINE DERIVATIVES FOR PAPER DYEING |
| U.S. Pat. No. 4,282,000 | Groll et al. | DYESTUFF SOLUTIONS, THEIR PREPARATION AND THEIR USE FOR DYEING PAPER |
| U.S. Pat. No. 4,654,045 | Rowe | PROCESS FOR PREPARATION OF CONCENTRATED ANIONIC RED DYE SOLUTIONS |

In Rowe, production of salt as a byproduct is avoided by displacing a volatile amine with the polyalkoxyalkylamine group. The resulting red dye solution is useful for permanently dyeing nylon. The polyalkoxyalkylamine substituent contains less than nine ethoxy or propoxy groups, preferably from one to three ethoxy groups. The oxyalkylene groups are added to enhance solubility rather than provide fugitivity.

Colorants containing ethoxylated aromatic amines are known in the prior art and exemplified by Gale et al., U.S. Pat. No. 3,154,534 and Kuhn, U.S. Pat. No. 3,157,633. In the aforementioned inventions, the alkoxylated amino nitrogen is covalently bonded to an aromatic ring comprising the chromophore. The substituted chromophore of Kuhn has from 75 to 150 ethyleneoxy units which provides fugitivity even after the colorant has been heat set on a textile material. When heat setting is not involved, approximately 30 ethyleneoxy units have been found to be sufficient to impart fugitivity.

Triethanolamine (TEA), a starting material used in the present invention, is a well known dye levelling agent. In an acid dye bath, TEA reduces penetration of the dye into a textile material to prevent differential dye uptake. Surfactant compositions of alkoxypropylamine are discussed in Funahashi, H., "The Interaction between Poly(oxyethyl)ated Alkoxypropylamine Surfactants and Dyes", Journal of Colloid and Interface Science, Vol. 125, No. 1, pp 279–285, Sept. 1988.

SUMMARY OF THE INVENTION

This invention fills a void in the prior art in that solutions of acid substituted chromophores and ethoxylated triethanolamines which are useful as fugitive inks and tints, have not been disclosed.

Accordingly, an aqueous solution of a fugitive colorant is provided comprising an acid substituted chromophore and a triethanolamine ethoxylate having at least 9 moles of ($-CH_2CH_2O-$) units. In a preferred embodiment, a triethanolamine ethoxylate is provided having between 12 and 75 ($-CH_2CH_2O-$) units.

The fugitivity of the colorants can be characterized by a fugitivity rating measured as the degree of staining which the colorant produces on skin and certain textile fibers. Under relatively mild wash conditions, the colorant compositions demonstrated dramatic improvements in fugitivity as compared to a solution of the chromophore without triethanolamine ethoxylate.

A wide range of acid dyes and acid substituted polymeric colorants, from yellow to violet, have been shown to be useful for practicing the invention. The chromophore molecules have at least one sulfonic acid or carboxylic acid functionality.

DESCRIPTION OF THE PREFERRED EMBODIMENT OF THE INVENTION

Without limiting the scope of the invention, the preferred features of the invention are hereinafter set forth.

Chromophores containing at least one sulfonic acid or carboxylic acid functionality are suitable for use in the invention. The acid functionality may be directly coupled to the chromophore or to a substituent on the chromophore. An example of suitable chromophores are acid dyes. By way of example, and not limitation, a list of preferred acid dyes is set forth in Table I below.

TABLE 1

| DYE | C.I. Number |
| --- | --- |
| Acid Yellow 135 (Manufactured by Imperial Chemicals Industries) | Not presently available |
| Acid Yellow 199 (Manufactured by Imperial Chemicals Industries) | Not presently available |
| Acid Orange 10 | 16230 |
| Acid Violet 12 | 18075 |
| Acid Violet 49 | 42640 |
| Acid Red 1 | 18050 |
| Acid Red 52 | 45100 |
| Acid Red 87 | 45380 |
| Acid Blue 25 | 62055 |
| Acid Blue 9 | 42090 |

Another category of suitable chromophores are polymeric colorants. Polymeric colorants are disclosed in Kuhn, U.S. Pat. No. 3,157,633. These colorants are characterized as having polymeric chains covalently bonded to a chromophore molecule. Particularly useful are compounds in which the polymeric substituent is polyethyleneoxide. The aforementioned polyethyleneoxide substituted colorants already demonstrate fugitivity with respect to textile fibers. The polymeric colorants useful herein also contain at least one sulfonic acid or carboxylic acid functionality.

The fugitivity of the subject chromophores is enhanced by forming a solution of the chromophore and a triethanolamine ethoxylate. The triethanolamine ethoxylate is prepared by adding the desired amount of ethylene oxide to triethanolamine under anhydrous conditions, in the presence of KOH. The structure of the amine ethoxylate is set forth below.

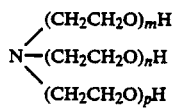

wherein m, n, and p are integers $>0$ and the sum of $m+n+p$ is at least 9. Preferably, the sum of $m+n+p$ is at lest 12 and more preferably at least 20. After addition of greater than 75 ($-CH_2CH_2O-$) units, diminishing increases in fugitivity are observed.

Various other amine ethoxylates may be adapted to the invention herein with success. However, amine substituents which increase the hydrophobic character of the amine ethoxylate, such as an alkyl group or propylene oxide addition products, would require that a greater number of moles of $-CH_2CH_2O-$ units would be necessary to maintain acceptable fugitivity.

Aqueous solutions of acid dyes and triethanolamine ethoxylate are particularly well suited for ink formulations. Typically, chromophore concentrations of 5 weight percent are used, although the chromophore concentration may vary from 1 to 10 weight percent depending on the tinctorial strength of the chromophore. As little as 1 weight percent triethanolamine ethoxylate may improve the fugitivity characteristics of the colorant solution. More preferably, a molar excess of triethanolamine ethoxylate is provided per acid functionality of the chromophore. In most applications, a triethanolamine ethoxylate concentration of 30 weight percent will provide sufficient molar excess. Those well skilled in the art may optimize the concentration of triethanolamine ethoxylate to achieve the desired fugitivity.

The invention herein may be adapted to myriad other inking processes, including non-aqueous systems. Formulations containing colorants and amine ethoxylate will vary according to performance requirements, e.g. viscosity, color strength, substrate, delivery method, etc.

Solutions of the polymeric colorants discussed herein, especially the polyethyleneoxide substituted colorants, exhibit significant fugitivity even in the absence of triethanolamine ethoxylate. These colorants are often used in the textile industry to color code fibers during manufacturing of yarn. For example, an aqueous solution containing from 5 to 40 weight percent polymeric colorant may be sprayed on the fiber to achieve a tinted fiber having from 0.1 to 0.5 weight percent colorant. The solution may also contain other additives such as a lubricant. The colorants are removed from the fabric prior to or during dyeing.

Regardless of the fugitivity of the polymeric colorant solution, the fugitivity may be enhanced by the addition of triethanolamine ethoxylate to the solution. Addition of from 1 to 30 weight percent triethanolamine ethoxylate has been found to be efficacious. As with the acid dye solution, preferably a molar excess of triethanolamine ethoxylate per acid group functionality of the polymeric colorant chromophore is provided.

The invention may be further understood by reference to the following examples but the invention is not to be construed as being unduly limited thereby. Unless otherwise indicated, all parts and percentages are by weight. Examples 1-5 are representative of ink formulations prepared according to the present invention.

EXAMPLE 1

A series of yellow colorant solutions was prepared by adding 9.3 parts Acid Yellow 135 to 10 parts triethanolamine (TEA) ethoxylate and 80.5 parts water. The number of moles of ethylene oxide added to the TEA was 9, 16, 25, 35, 48 and 61 for the six solutions, respectively.

A standard dye solution in water only was prepared by adding 9.3 parts Acid Yellow 135 to 90.5 parts water. Also, a standard solution in water and polyethyleneglycol (PEG) was prepared by adding 9.3 parts Acid Yellow 135 to 10 parts PEG 300 and 80.5 parts water.

EXAMPLE 2

A blue colorant was formed by adding 7.3 parts Acid Blue 25 to 10 parts triethanolamine (TEA) ethoxylate and 82.7 parts water. The number of moles of ethylene oxide added to the TEA was 9, 16, 25, 35, 48 and 61 for the six solutions, respectively.

A standard dye solution in water only was prepared by adding 7.3 parts Acid Blue 25 to 92.7 parts water. Also, a standard solution in water and polyethyleneglycol (PEG) was prepared by adding 7.3 parts Acid Blue 25 to 10 parts PEG 300 and 82.7 parts water.

EXAMPLE 3

A red colorant was formed by adding 3 parts Acid Red 1 to 10 parts triethanolamine (TEA) ethoxylate and 87 parts water. The number of moles of ethylene oxide added to the TEA was 9, 16, 25, 35, 48 and 61 for the six solutions, respectively.

A standard dye solution in water only was prepared by adding 3 parts Acid Red 1 to 97 parts water. Also, a standard solution in water and polyethyleneglycol (PEG) was prepared by adding 3 parts Acid Red 1 to 10 parts PEG 300 and 87 parts water.

EXAMPLE 4

A series of fluorescent red colorant solutions was prepared by adding 1 part Acid Red 52 to 17.6 parts triethanolamine (TEA) ethoxylate and 157 parts water. The number of moles of ethylene oxide added to the TEA was 9, 16, 25, 35, 48 and 61 for the six solutions, respectively.

A standard dye solution in water only was prepared by adding 1 part Acid Red 52 to 174.6 parts water. Also, a standard solution in water and polyethyleneglycol (PEG) was prepared by adding 1 part Acid Red 52 to 17.6 parts PEG 300 and 157 parts water.

EXAMPLE 5

A series of violet colorant solutions was prepared by adding 3.8 parts Acid Violet 12 to 10 parts triethanolamine (TEA) ethoxylate and 86.2 parts water. The number of moles of ethylene oxide added to the TEA was 9, 16, 25, 35, 48 and 61 for the six solutions, respectively.

A standard dye solution in water only was prepared by adding 3.8 parts Acid Violet 12 to 96.2 parts water. Also, a standard solution in water and polyethyleneglycol (PEG) was prepared by adding 3.8 parts Acid Violet 12 to 10 parts PEG 300 and 86.2 parts water.

Fugitivity Testing

Hand Fugivity

The colorant solution is applied to the palm of the hand directly from a pen or by a cotton swab in such a fashion to deliver a continuous line of color approximately 3" long and ¼" wide. This mark is allowed to air dry at ambient temperature for five minutes whereby the hand is then washed with warm water and IVORY ® brand soap. The colorant is rated visually on a scale from zero to five for its washability from skin. On this scale, zero represents imperceptible staining with five indicating the colorant exhibits no washability feature.

Textile Product Fugitivity

Fugitivity of colorant solutions from textile materials were evaluated on cotton and polyester/cotton (poly/cotton) fabrics. The test fabrics were prewashed, dried and ironed according to ASTM D4265 and cut in 6×7 inch sample rectangles (7 inch warp direction and using only the center 36 inches of the fabric). The test fabrics were mounted in an embroidery hoop, centered over a 600mL beaker and 0.6mL of colorant delivered to the fabric. Even application of the colorant was accomplished by dropwise addition to form a 6 centimeter diameter circle whereby drops were placed 1 centimeter apart starting on the outside of the circle and spiraling inward to the center. The stained area was then rubber with a hydrophobic smoothing device in vertical and horizontal directions to insure a uniform deposit of colorant over the surface inside the specified diameter. The samples were allowed to air dry for 4 hours prior to the laundering procedure.

The samples were prepared for laundering by placing the individual sample in a 2L beaker or bucket into which is continuously flowing 100° Fahrenheit water. The sample is hand agitated for 10 seconds whereby the container is emptied followed by returning the sample to the container and continuing with the running water rinse. This process is repeated two times for a total of 30 seconds of rinsing. Excess water is hand squeezed from the sample and the sample is attached to the edge of a dry towel such that the stained area extends out from the towel. A maximum of 14 test samples can be affixed to towel(s) for one washing cycle with sufficient dummy cloth added to the washer to provide a wash load total of four pounds. The samples were laundered in a washing machine using 105° Fahrenheit water, a 12 minute normal wash cycle, maximum water level and using 100 grams of TIDE ® brand washing detergent. The wash cycle was followed by a cold water rinse and the samples dried in a dryer set on normal dry for 40 minutes. The colorant is rated visually for its fugitivity from the specified fabrics on a scale from zero to five, whereby zero represents imperceptible staining and five indicating the colorant exhibits no washability feature.

EXAMPLE 6

The fugitive colorant solution and standards of Example 1 were tested on cotton, poly/cotton, and a person's hand according to the above-described procedure. The results are set forth in Table 2 below.

TABLE 2

| Additive | Cotton | Fugitivity Rating Poly/Cotton | Fugitivity Rating Hand |
|---|---|---|---|
| TEA 9 + water | 1 | 1 | 0.5 |
| TEA 16 + water | 1 | 1 | 0.5 |
| TEA 25 + water | 1 | 2 | 0.5 |
| TEA 35 + water | 0.5 | 1 | 0 |
| TEA 48 + water | 0.5 | 1 | 0.5 |
| TEA 61 + water | 0.5 | 1 | 0 |
| PEG 300 + water | 1 | 2 | 2 |
| Water only | 1 | 2 | 1 |

*TEA refers to triethanolamine and the following number refers to the number of moles of ethylene oxide added to 1 mole of triethanolamine.
Rating system:
0 = imperceptible staining
1 = minimum staining
2 = medium staining
3 = medium heavy staining
4 = heavy staining
5 = no apparent washability

EXAMPLE 7

The fugitive colorant solution and standards of Example 2 were tested on cotton, poly/cotton, and a persons hand according to the above-described procedure. The results are set forth in Table 3 below.

TABLE 3

| Additive | Cotton | Fugitivity Rating Poly/Cotton | Fugitivity Rating Hand |
|---|---|---|---|
| TEA 9 + water | 2 | 1 | 1 |
| TEA 16 + water | 2 | 0.5 | 1 |
| TEA 25 + water | 2 | 1 | 0.5 |
| TEA 35 + water | 1 | 0.5 | 0.5 |
| TEA 48 + water | 1 | 1 | 0.5 |
| TEA 61 + water | 1 | 0.5 | 0.5 |
| PEG 300 + water | 3 | 2 | 3 |
| Water only | 3 | 2 | 1 |

EXAMPLE 8

The fugitive colorant solution and standards of Example 2 were tested on cotton, poly/cotton, and a persons hand according to the above-described procedure. The results are set forth in Table 4 below.

TABLE 4

| Additive | Cotton | Fugitivity Rating Poly/Cotton | Fugitivity Rating Hand |
|---|---|---|---|
| TEA 9 + water | 0.5 | 0.5 | 1 |
| TEA 16 + water | 0.5 | 0.5 | 1 |
| TEA 25 + water | 1 | 1 | 1 |
| TEA 35 + water | 0.5 | 0.5 | 1 |
| TEA 48 + water | 0 | 0.5 | 0.5 |
| TEA 61 + water | 0.5 | 0.5 | 0.5 |
| PEG 300 + water | 1 | 1 | 1 |
| Water only | 1 | 2 | 2 |

EXAMPLE 9

The fugitive colorant solution and standards of Example 2 were tested on cotton, poly/cotton, and a persons hand according to the above-described procedure. The results are set forth in Table 5 below.

TABLE 5

| Additive | Cotton | Fugitivity Rating Poly/Cotton | Fugitivity Rating Hand |
|---|---|---|---|
| TEA 9 + water | 0 | 0 | 1 |
| TEA 16 + water | 0 | 0 | 1 |
| TEA 25 + water | 0 | 0 | 1 |
| TEA 35 + water | 0 | 0 | 0.5 |
| TEA 48 + water | 0 | 0 | 1.0 |
| TEA 61 + water | 0 | 0.5 | 0.5 |
| PEG 300 + water | 0 | 0.5 | 3 |
| Water only | 0 | 1 | 2 |

EXAMPLE 10

The fugitive colorant solution and standards of Example 2 were tested on cotton, poly/cotton, and a persons hand according to the above-described procedure. The results are set forth in Table 6 below.

TABLE 6

| Additive | Cotton | Fugitivity Rating Poly/Cotton | Fugitivity Rating Hand |
|---|---|---|---|
| TEA 9 + water | 0.5 | 1 | 1 |
| TEA 16 + water | 0.5 | 1 | 1 |
| TEA 25 + water | 1 | 1 | 0.5 |
| TEA 35 + water | 0.5 | 0.5 | 1 |
| TEA 48 + water | 0 | 0.5 | 0.5 |
| TEA 61 + water | 0 | 0.5 | 0.5 |
| PEG 300 + water | 1 | 2 | 1 |
| Water only | 1 | 3 | 3 |

Examples 11-21 represent application of this invention to polymeric colorants.

EXAMPLE 11

Synthesis of a Red Azo Polymeric Colorant

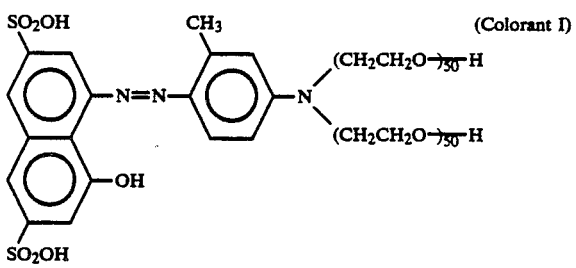

(Colorant I)

Three hundred nineteen grams of 1-Naphthol-8-amino-3,6-disulfonic acid was converted to the diazonium salt using sodium nitrite and HCl in water. This diazonium salt was then coupled with 4507g m-toluidine polyethylene glycol made by adding 100 moles (4400g) of ethylene glycol to one mole (107g) m-toluidine. The resulting red colorant (Colorant I) was then diluted with water to an absorptivity of 0.6 at the λ max of the solution.

EXAMPLE 12

Synthesis of Colorant I TEA 27

To a one liter, four necked flask equipped with a mechanical stirrer, a thermometer, a pH probe, and an addition funnel, 48.7g of Colorant I was charged. The pH of this material was then lowered to 2.0 by the addition of 1.2g concentrated HCl. Then 24.7g of TEA 27 was added to the colorant over a five minute period. The mixture was then vacuum stripped to an absorptivity of 0.6 at the λ max of the solution and a final yield of 60.2g.

EXAMPLE 13

Synthesis of a Blue Triphenylmethane Polymeric Colorant

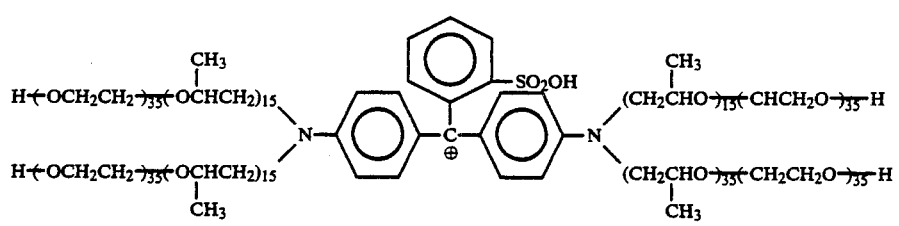

(Colorant II)

Thirty moles (1320g) of propylene oxide and seventy moles (3080) of ethylene oxide were added to one mole (93g) of aniline forming the alkoxylated intermediate. One hundred sixty-eight grams of this intermediate was then allowed to condense with 4.5g of o-formyl benzene sulfonic acid in the presence of concentrated sulfuric acid and heat. The resulting reaction mixture was then neutralized and oxidized following standard procedures. The resulting blue polymeric colorant (Colorant II) was then diluted with water to an absorptivity of 0.6 at the max of the solution.

EXAMPLE 14

Synthesis of Colorant II TEA 27

To a one liter, four necked flask equipped with a mechanical stirrer, a thermometer, a pH probe, and an addition funnel, 100g of Colorant II Blue was charged. The pH of this material was then lowered to 2.0 by the addition of concentrated HCl. Then 7.7g of TEA 27 was added to the colorant over a five minute period. The mixture was then vacuum stripped to an absorptivity of 0.6 at the λ max of the solution.

EXAMPLE 15

Synthesis of Colorant II TEA 75

To a one liter, four necked flask equipped with a mechanical stirrer, a thermometer, a pH probe, and an addition funnel, 100g of Colorant II Blue was charged. The pH of this material was then lowered to 2.0 by the addition of concentrated HCl. Then 19.3g of TEA 75 was allowed to add to the colorant over a five minute period. The mixture was then vacuum stripped to an absorptivity of 0.6 at the λ max of the solution.

EXAMPLE 16

Synthesis of VERSATINT® Yellow II TEA 14

To a one liter, four necked flask equipped with a mechanical stirrer, a thermometer, a pH probe, and an addition funnel, 745.9g of VERSATINT® Yellow II was charged. The pH of this material was then lowered to 2.0 by the addition of 9.5g concentrated HCl. Then 4.4g of TEA 14 was added to the colorant over a five minute period. The mixture was then vacuum stripped to an absorptivity of 0.6 at the λ max of the solution and a final yield of 684.7g.

EXAMPLE 17

Synthesis of VERSATINT® Yellow II TEA 51

To a one liter, four necked flask equipped with a mechanical stirrer, a thermometer, a pH probe, and an addition funnel, 373.0g of VERSATINT® Yellow II was charged. The pH of this material was then lowered to 2.0 by the addition of 4.8g concentrated HCl. Then 6.0g of TEA 51 was added to the colorant over a five minute period. The mixture was then vacuum stripped to an absorptivity of 0.6 at the λ of the solution and a final yield of 323.0g.

EXAMPLE 18

Synthesis of VERSATINT® Yellow II TEA 27

To a one liter, four necked flash equipped with a mechanical stirrer, a thermometer, a pH probe, and an addition funnel, 363.9g of VERSATINT® Yellow II was charged. The pH of this material was then lowered to 2.0 by the addition of concentrated HCl. Then 13.5g of TEA 27 was added to the colorant over a five minute period. The mixture was then vacuum stripped to an absorptivity of 0 6 at the λ max of the solution and a final yield of 326.3g.

EXAMPLE 19

Synthesis of VERSATINT® Green II TEA 27

To a one liter, four necked flask equipped with a mechanical stirrer, a thermometer, a pH probe, and an addition funnel, 63.5g of VERSATINT® Green II was charged. The pH of this material was then lowered to 2.0 by the addition of 3.0g concentrated HCl. Then 6.5g of TEA 27 was added to the colorant over a five minute period. The mixture was then vacuum stripped to an absorptivity of 0.6 at the λ max of the solution and a final yield of 295.2g.

EXAMPLE 20

Synthesis of VERSATINT® Green II TEA 14

To a one liter, four necked flask equipped with a mechanical stirrer, a thermometer, a pH probe, and an addition funnel, 63.5g of VERSATINT® Green II was charged. The pH of this material was then lowered to 2.0 by the addition of 3.0g concentrated HCl. Then 2.0g of TEA 14 was added to the colorant over a five minute period. The mixture was then vacuum stripped to an absorptivity of 0.6 at the λ max of the solution and a final yield of 303.7g.

EXAMPLE 21

Synthesis of VERSATINT Green II TEA 51

To a one liter, four necked flask equipped with a mechanical stirrer, a thermometer, a pH probe, and an addition funnel, 301.0g. of VERSATINT® Green II was charged. The pH of this material was then lowered to 2.0 by the addition of 3.1g concentrated HCl. Then 13 0g. of TEA 51 was added to the colorant over a five minute period. The mixture was then vacuum stripped to an absorptivity of 0.6 of the λ max of the solution and a final yield of 268.5g.

Fugitive Tint Testing

A test was constructed which would simulate actual processing conditions that textile materials would encounter during tufting and continuous dyeing in manufacturing carpet. This test was used to determine the fugitivity of various tints when they were subjected to these conditions.

First, 4 inch by 4 inch undyed squares of nylon carpet are cut, and the level of color on them was determined using a Hunter Labscan Colorimeter. The samples were then sprayed with a colorant solution such that around 0.5% by weight colorant was applied to the carpet square. The samples were allowed to dry overnight and were then read on the colorimeter again. The samples were then allowed to age for one week. They were dipped in an acid solution, pH5, for 30 seconds and vacuumed. They were dipped in a more acidic solution, pH2.2, and allowed to drain. The samples were sprayed twice with water, vacuumed, then steamed and vacuumed a final time. The wet samples were dried in a convection oven and read one last time on a colorimeter. The results of this last color measurement were compared to the first. A five point scale was developed in which a score of 0.00 indicates that the tint was 100% fugitive, and the carpet square returned to its completely white shade.

The solutions of polymeric colorant and triethanolamine ethoxylate described in Examples 11–21 were compared with aqueous solutions of the polymeric colorants alone cut to corresponding absorptivity values. The results are reproduced in Table 7 below.

TABLE 7

| Tint* | Score |
|---|---|
| Yellows | |
| VERSATINT ® Yellow II | 2.66 |
| VERSATINT ® Yellow II TEA 14 | 1.70 |
| VERSATINT ® Yellow II TEA 27 | 1.53 |
| VERSATINT ® Yellow II TEA 51 | 1.72 |
| Reds | |
| Colorant I | 3.17 |
| Colorant I TEA-27EO | 0.65 |
| Greens | |
| VERSATINT ® Green II | 1.88 |
| VERSATINT ® Green II TEA 14 | 1.81 |
| VERSATINT ® Green II TEA 27 | 1.77 |
| VERSATINT ® Green II TEA 51 | 1.45 |
| Blues | |
| Colorant II | 3.61 |
| Colorant II TEA 27 | 3.12 |
| Colorant II TEA 75 | 3.14 |

*TEA refers to triethanolamine and the following number refers to the number of moles of ethylene oxide added to 1 mole of triethanolamine.
Rating system:
0 = imperceptible staining
1 = minimum staining
2 = medium staining
3 = medium heavy staining
4 = heavy staining
5 = no apparent washability Of course there are other obvious modifications and alternate embodiments which are intended to the included in the scope of the following claims.

What we claim is:

1. A fugitive colorant solution comprising a chromophore, having at least one sulfonic acid or carboxylic acid functionality, in an amount sufficient to provide coloration of said solution and at least one molar equivalent of triethanolamine ethoxylate per acid functionality of said chromophore, said triethanolamine ethoxylate having greater than 25 moles of —CH$_2$CH$_2$O— units.

2. A fugitive colorant solution according to claim 1 wherein said chromophore comprises 1 to 40 weight percent of said solution.

3. A fugitive colorant solution according to claim 2 wherein said solution is aqueous.

4. A fugitive colorant solution according to claim 3 wherein said functionality is sulfonic acid.

5. A fugitive colorant solution according to claim 1 wherein said chromophore comprises 1 to 10 weight percent of said solution.

6. A fugitive colorant solution according to claim 5 wherein said chromophore is an acid dye.

7. A fugitive colorant solution according to claim 6 wherein said solution is aqueous.

8. A fugitive colorant solution according to claim 2 wherein said chromophore is selected from azo, triphenylmethane, anthraquinone and methine compounds.

9. A fugitive colorant solution according to claim 8 wherein said solution is aqueous.

10. A fugitive colorant solution according to claim 9 wherein said functionality is sulfonic acid.

11. A fugitive colorant solution according to claim 3 wherein said chromophore is Acid Red 52.

12. A fugitive colorant solution according to claim 1 wherein said chromophore comprises from 5 to 40 weight percent of said solution.

13. A fugitive colorant solution according to claim 12 wherein said chromophore has covalently bonded polyethyleneoxy substituents, said substituents having at least 10 moles of —CH$_2$CH$_2$O— units.

14. A fugitive colorant solution according to claim 13 wherein said solution is aqueous.

15. A fugitive colorant solution comprising from 1 to 40 weight percent of a chromophore having at least one sulfonic acid or carboxylic acid functionality, wherein said chromophore is selected from azo, triphenylmethane, anthraquinone and methine compounds, and from 1 to 30 weight percent of a triethanolamine ethoxylate, said triethanolamine ethoxylate having greater than 9 moles of —CH$_2$CH$_2$O— units.

16. A fugitive colorant solution according to claim 15 wherein said triethanolamine ethoxylate comprises greater than 12 moles of CH$_2$CH$_2$O— units.

17. A fugitive colorant solution according to claim 16 wherein said triethanolamine ethoxylate comprises at least 20 moles of —CH$_2$CH$_2$O— units.

18. A fugitive colorant solution according to claim 17 wherein said solution is aqueous.

19. A fugitive colorant solution according to claim 18 wherein said functionality is sulfonic acid.

20. A fugitive colorant solution according to claim 15 wherein said chromophore comprises from 1 to 10 weight percent of said solution and at least one molar equivalent of said triethanolamine ethoxylate is present per acid functionality of said chromophore.

21. A fugitive colorant solution according to claim 20 wherein said chromophore is an acid dye.

22. A fugitive colorant solution according to claim 21 wherein said solution is aqueous.

23. A fugitive colorant solution according to claim 22 wherein said functionality is sulfonic acid.

24. A fugitive colorant solution according to claim 19 wherein at least one molar equivalent of said triethanolamine ethoxylate is present per acid functionality of said chromophore, said chromophore is present in 5 to 40 weight percent of said solution and said chromophore has covalently bonded polyethyleneoxy substituents, said substituents having at least 10 moles of —CH$_2$CH$_2$O— units.

25. A fugitive colorant solution comprising a chromophore having at least one sulfonic acid or carboxylic acid functionality, wherein said chromophore is selected from azo, triphenylmethane, anthraquinone and methine compounds, in an amount sufficient to provide coloration of said solution and at least one molar equivalent of an amine ethoxylate per acid functionality of said chromophore, said amine ethoxylate having the following formula

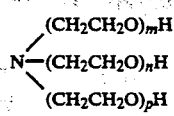

wherein m, n, and p are integers, and the sum of m+n+p is greater than 9.

26. A fugitive colorant solution according to claim 25 wherein the sum of m+n+p is greater than 12.

27. A fugitive colorant solution according to claim 26 wherein said chromophore comprises from 1 to 40 weight percent of said solution.

28. A fugitive colorant solution according to claim 27 wherein said solution is aqueous.

29. A fugitive colorant solution according to claim 28 wherein said functionality is sulfonic acid.

30. A fugitive colorant solution according to claim 25 wherein m, n and p are integers greater than 0, the sum of m+n+p is at least 20 and less than 75, from 1 to 40 weight percent of said chromophore is present in said solution and from 1 to 30 weight percent of said amine ethoxylate is present in said solution.

* * * * *